United States Patent Office 3,076,654
Patented Feb. 5, 1963

3,076,654
FINE MATERIAL SPREADING ATTACHMENT
FOR A MANURE SPREADER
Herbert W. Colwill, Celina, and John H. Schenking, Coldwater, Ohio, assignors to Avco Corporation, Coldwater, Ohio, a corporation of Delaware
Filed Dec. 4, 1961, Ser. No. 156,641
2 Claims. (Cl. 275—6)

This invention relates to a fine material spreading attachment for a manure spreader.

The particular attachment illustrated is applied to a manure spreader having a flail cylinder and the attachment assures satisfactory spreading of fine material as a fertilizer which might otherwise be thrown onto the ground in concentrated amounts, often resulting in over-fertilization injurious to vegetation.

It is a primary object to provide a means to spread fine material which might otherwise be ejected in a concentrated amount by a spreader conveyor over the outlet end of a spreader box, such means comprising a retaining pan extending in curved relationship around the end and under the spreader box adjacent but spaced from the bottom thereof over a region under the box, the spreader conveyor running between the retaining pan and the under side of the box bottom so that fine material carried by the conveyor under the bottom of the box will be ejected through openings in the pan retaining member and thereby avoid concentrated distribution of such material over the end of the box.

It is a further object to provide means operating in cooperation with a spreader having a rotating beater at the end of a conveyor for distributing material from under the beater with such means comprising a retaining pan for fine material so positioned that such material will either be ejected and spread by the beater rotating close to the edge of the retaining pan or be carried by the conveyor in the pan extending under the floor of the spreader box to be distributed through openings in the pan.

The above and other objects of the invention will appear more fully from the following more detailed description and by the accompanying drawings forming a part hereof and wherein.

Figure 1:
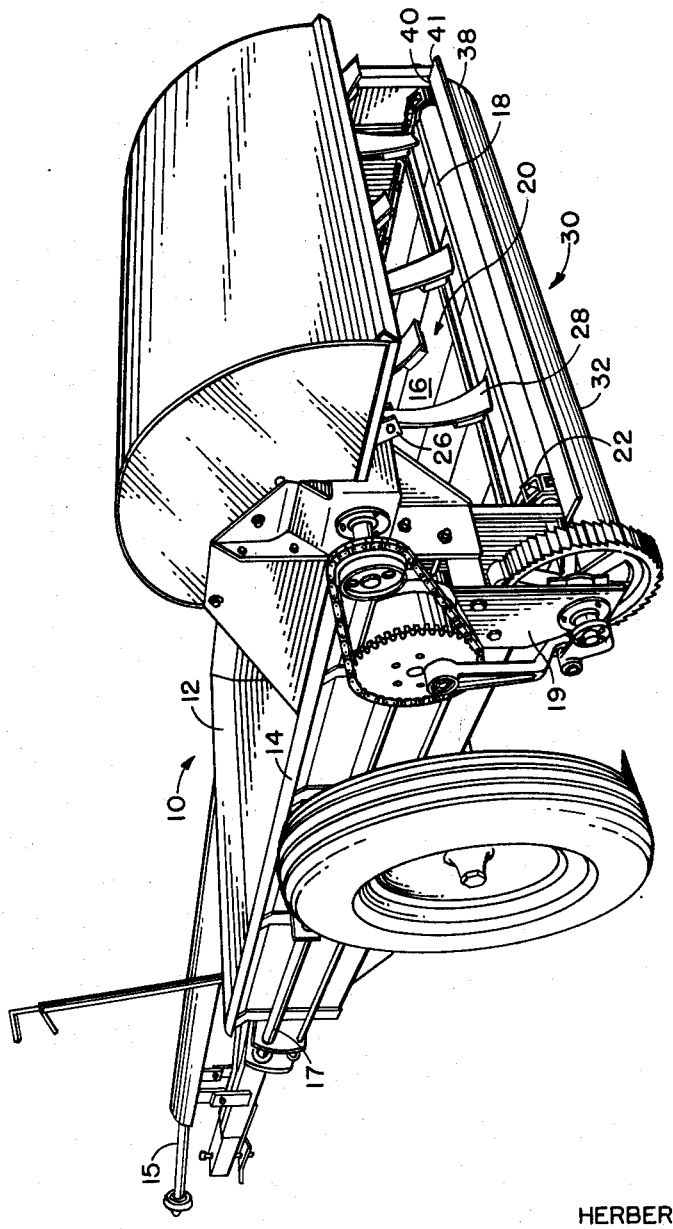
FIG. 1 is a perspective view of a spreader with the attachment member in place at the end of the conveyor.
Figure 2:
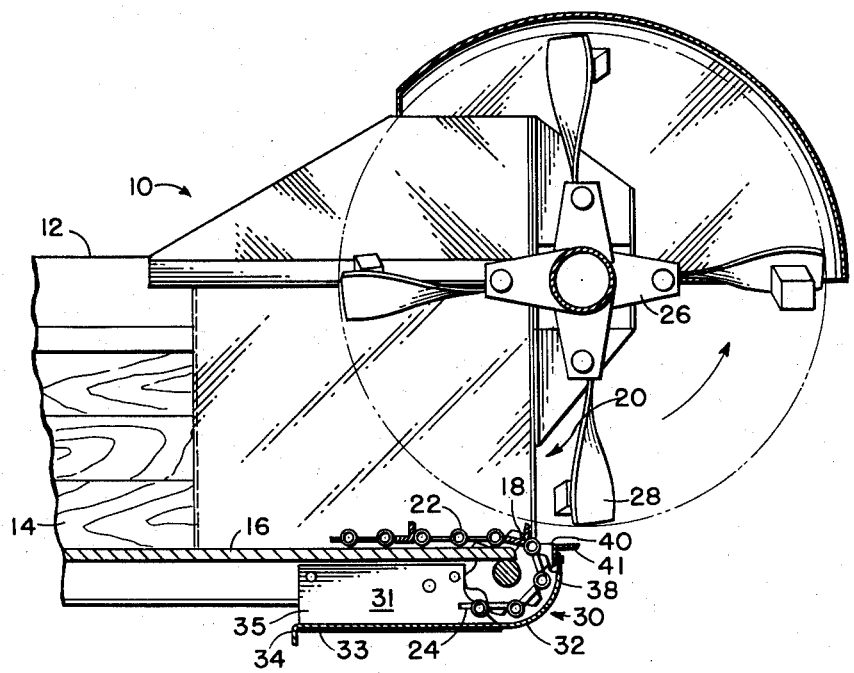
FIG. 2 is a longitudinal cross section through the conveyor and adjacent flail showing the location of the attachment.
Figure 3:
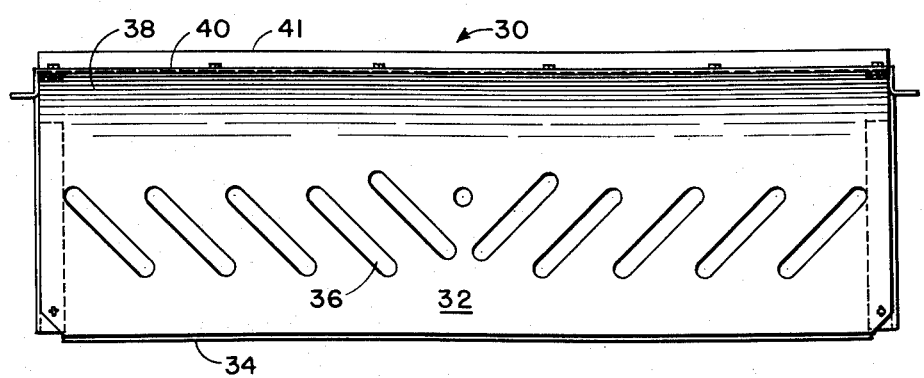
FIG. 3 is a bottom view of the attachment member showing the diagonally positioned slots or openings for distributing the fine material therefrom.

Referring to the drawings, FIG. 1 shows a manure spreader 10, a type of spreading apparatus which comprises a material containing box 12 with sides 14 and bottom 16. The bottom of the box terminates in a rear edge 18 at the open discharge end 20 of the box and an endless conveyor 22 is mounted for movement rearwardly of the bottom 16 of the box 12. The conveyor 22 extends around the rear edge 18 of the bottom of the box with a return portion 24 of the conveyor carried under the bottom of the box. A rotatable spreading beater 26 is mounted for rotation on an axis transversely of the box at the rear open end 20 thereof and above the rear edge 18 with beater elements 28 of the beater of such length as to rotate closely adjacent the rear edge 18 and also adjacent the conveyor 22 during its movement adjacent the beater. The beater 26, illustrated, rotates in a direction downwardly against the load carried rearwardly by the conveyor toward the beater, and material ejected from the box by the beater is ejected from under the beater for scattering to the ground. It is understood that the beater and conveyor are actuated from the tractor which draws the device through a power-take-off shaft 15 and suitable transmitting connections 17 and gearing 19 in a manner well known in the art. The mechanism so far described is a spreader of the type known in the art, and it is the combination of the elements of such device with the elements of the spreading attachment 30 positioned at the end and under the box, which comprises the invention. The attachment 30 comprises a pan 32, preferably formed of sheet metal, having a width substantially equal to the width of the box 12 and having a major forwardly extending portion 33 which extends under the box and is spaced from the bottom of the box and covers a region adjacent the rear edge 18 of the bottom of the box with sufficient space between the under surface of the bottom of the box and the pan 32 to allow movement of the conveyor 22 therebetween. This pan 32 is held in position by suitable brackets 31 between the pan and the sides of the box. The forwardly extending portion 33 of the pan 32 terminates in a front edge 34, providing an opening 35 to the ground at the front edge of the pan a distance forward of the rear edge of the bottom of the box. A plurality of distributing openings 36, shown in FIG. 3 as diagonally positioned in the bottom of the box, are provided. The pan 32 has a rearwardly and upwardly extending retaining portion 38 curved and spaced from the box bottom 16 and edge 18, and it terminates in an edge 40 which is substantially in alignment with the box bottom 16 and spaced from edge 18 a distance allowing the conveyor 22 in its return flight to pass between the rear edge of the box and the edge 40 of the pan. The edge 40 of the pan is preferably reinforced by a shear bar 41 which extends along the edge 40 of the pan and actually reinforces that edge in a structure capable of withstanding the hard usage to which it is subjected. The beater 26 with its beater elements 28 rotate with their ends closely contiguous to the edge 18, the conveyor 22, and the edge 40 with its shear bar 41. The actual clearance in the illustrated mechanism is approximately one half inch between the end of the beater elements 28 of the shear bar 41.

The operation of the device is as follows: The box 12 contains material to be spread, and it is assumed in this instance that such material contains a portion of fine material. If no attachment 30 of the type herein disclosed were provided, a large portion of such fine material (the major part of which would be distributed by the beater) would fall directly to the ground, over the edge 18 of the end of the box as carried by the conveyor 22. However, with the attachment 30, as above described, in position, the retaining pan formed in curved relationship with the edges 40 and shear bar 41 closely adjacent to the rotating beater, the material not picked up and ejected in a scattering relationship by the end of the beater will be retained by the pan 32 and carried under the box on the pan and over the distributing openings 36 and thus distributed to the ground. Such material as is not distributed through the openings 36 will be carried out at the front edge 34 of the pan at the opening 35. Thus the result will be a distribution of fine material over the ground in a less concentrated amount with more advantageous results for fertilization.

The invention has been described by referenec to a specific illustrative structure but modifications thereof are intended within the scope of the following claims.

We claim:
1. A fine material spreading attachment for a spreading apparatus of the type including a box with sides and bottom with the bottom of the box terminating in a rear edge at an open dicharge end of the box and with an endless conveyor mounted for movement rearwardly on the bottom of the box and extending around the rear edge of the bottom of the box at the open end thereof with a return portion of the conveyor under the bottom of the box and with a rotatable spreading beater mounted for rotation on an axis transversely of the box at the rear open end thereof above said bottom rear edge with beater elements of such length as to rotate closely adjacent said rear edge and said conveyor during the rotation of the beater, the beater rotating in a direction to act downwardly on material carried in the box and to eject and spread material in a rearward direction from under the beater, said attachment comprising the combination with aforesaid of:

A pan having a width substantially equal to the width of the box;

a forwardly extending portion of said pan extending from said rear edge of said box under and spaced from the bottom of said box with sufficient space between the under surface of the bottom of the box and the pan to allow movement of said conveyor therebetween;

said pan terminating in a front edge providing an opening to the ground from under the box a distance forward of the rear edge of the bottom of the box;

with a plurality of distributing openings in the forwardly extending portion of the pan under the box;

said pan having a rearwardly and upwardly extending retaining portion spaced from the rear edge of the box;

and terminating in a rear edge of said pan substantially in alignment with the bottom of the box and spaced therefrom a distance substantially equal to the thickness of the conveyor and sufficient to allow the return flight of the conveyor to pass between the rear edge of the box and the edge of the pan;

said pan edge being reinforced with a shear bar positioned to terminate adjacent and under the rotating beater in close relationship to the radially extending ends of the beater elements thereof.

2. A fine material spreading attachment for a spreading apparatus of the type including a box with sides and bottom, with the bottom of the box terminating in a rear edge at an open discharge end of the box and an endless conveyor mounted for movement rearwardly on the bottom of the box and extending around the rear edge of the bottom of the box at the open end thereof, with a return portion of the conveyor under the bottom of the box and with a rotatable spreading flail type beater carrying a plurality of swingably mounted flail members in rotation in a substantially cylindrical rotating unit mounted for rotation on an axis transversely of the box at the rear open end thereof with said flail members radially extended during the rotation moving closely adjacent to the end of the conveyor with the direction of rotation of said beater such as to cause said flail members to act downwardly on material carried in the box and to eject and spread material in a rearward direction from under the beater, said attachment comprising the combination with the aforesaid of:

a pan having a width substantially equal to the width of the box;

a forwardly extending portion of said pan extending from said rear edge of said box under and spaced from the bottom of the box in amount sufficient to allow movement of said conveyor therebetween;

said pan terminating in a front edge providing an opening to the ground from under the box a distance forward of the rear edge of the bottom of the box;

with a plurality of distributing openings in the forwardly extending portion of the pan under the box;

said pan having a rearwardly and upwardly extending retaining portion spaced from the end of the box in amount substantially equal to the thickness of said conveyor;

and terminating in a rear edge of said pan substantially in alignment with the bottom of the box and spaced therefrom a distance substantially equal to the thickness of the conveyor and sufficient to allow the return flight of the conveyor to pass between the rear edge of the box and the edge of the pan;

said pan edge being reinforced with a shear bar positioned to terminate adjacent and under the rotating flail type beater in close relationship to the radially extending ends of said swingably mounted flail members.

References Cited in the file of this patent
UNITED STATES PATENTS

| | | |
|---|---|---|
| 1,669,693 | Caar | May 15, 1928 |
| 1,856,417 | Hyland | May 3, 1932 |
| 1,900,299 | Oppenheim | Mar. 7, 1933 |
| 2,952,466 | Carlson et al. | Sept. 13, 1960 |
| 2,958,530 | Kucera et al. | Nov. 1, 1960 |
| 3,025,067 | Raney et al. | Mar. 13, 1962 |